H. M. PFLAGER.
SIX WHEEL CAR TRUCK.
APPLICATION FILED SEPT. 6, 1913.
1,105,300.
Patented July 28, 1914.
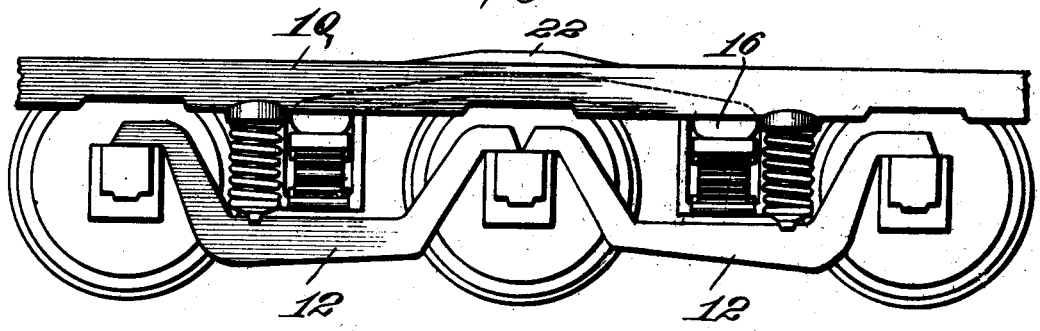
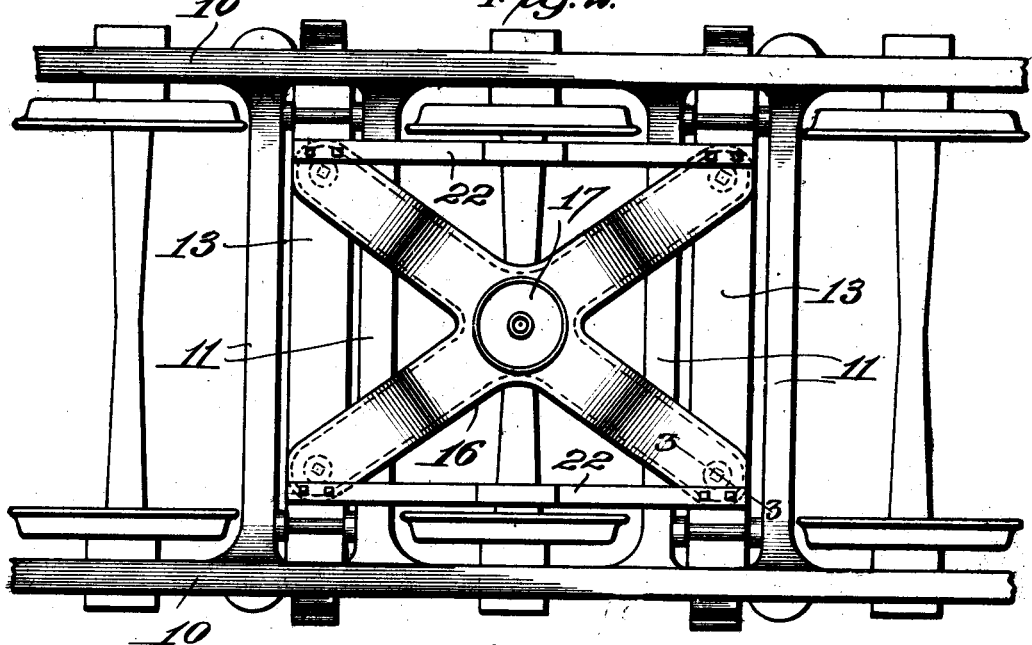
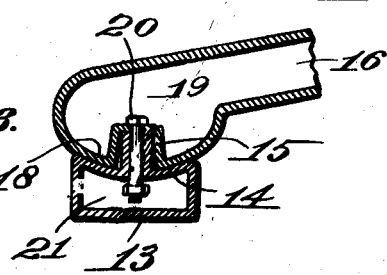
Witnesses:
Inventor:
Harry M. Pflager,

UNITED STATES PATENT OFFICE.

HARRY M. PFLAGER, OF ST. LOUIS, MISSOURI, ASSIGNOR TO DOUBLE BODY BOLSTER COMPANY, OF ST. LOUIS, MISSOURI, A CORPORATION OF NEW JERSEY.

SIX-WHEEL CAR-TRUCK.

1,105,300.   Specification of Letters Patent.   Patented July 28, 1914.

Application filed September 5, 1913. Serial No. 788,296.

*To all whom it may concern:*

Be it known that I, HARRY M. PFLAGER, a citizen of the United States, residing at the city of St. Louis, State of Missouri, have invented a certain new and useful Improvement in Six-Wheel Car-Trucks, of which the following is a full, clear, and exact description, such as will enable others skilled in the art to which it appertains to make and use the same, reference being had to the accompanying drawings, forming part of this specification, in which—

Figure 1 is a side elevational view of a six wheel truck of my improved construction. Fig. 2 is a plan view of the truck. Fig. 3 is an enlarged detail section taken approximately on the line 3—3 of Fig. 2.

This invention relates generally to new and useful improvements in car trucks, and more particularly to a one piece center bolster and the manner of mounting the same upon the cross bolster of a six wheel car truck.

In six wheel car trucks provided with an X or H-shaped center bolster it has usually been the practice to rigidly connect the ends of the arms of the center bolster to the cross bolsters, and where such construction is carried out and one of the forward wheels of the truck passes over a sharp rise in the track, such as for instance, an uneven rail joint, the corresponding or adjacent corner of the center bolster is elevated, thus throwing the load onto two diagonally opposite corners, and this action doubles the load on the two opposite diagonal corners by reason of the bolster being formed in a single piece, and consequently said bolster must be made of extra strength and consequently very heavy in order to meet these conditions.

In the construction of my improved truck I propose to make the cross bolsters separate from the center bolster and to mount said center bolster upon said cross bolsters so that it will not only be properly supported thereby, but will be flexibly connected thereto, so that while one of the forward wheels rises in passing over a sharp elevation of the track rail the joints between the center bolster and cross bolsters will yield thereby overcoming all tendency of the forces produced to distort or strain the center bolster.

By my improved construction, it is possible to make the cross bolsters and center bolster comparatively light in weight and yet said parts will have the requisite strength to meet all M. C. B. requirements and service conditions.

To the above purposes my invention consists in certain novel features of construction and arrangement of parts hereinafter more fully described and claimed.

Referring by numerals to the accompanying drawings, 10 designates the wheel pieces of a six wheel truck frame, 11 the transoms, 12 the usual equalizers, the ends of which rest upon the journal boxes, and 13 the cross bolsters, which are yieldingly supported on springs carried by spring planks, which latter are supported from the truck frame by means of suitable swing hangers.

The cross bolsters 13 may be of any desired cross sectional shape and formed in the top surfaces thereof near their ends are slightly concaved recesses or bearing seats 14. Formed integral with the cross bolsters and projecting upwardly from the centers of these recesses are tubular lugs or bosses 15.

The center bolster 16 as contemplated by my invention is formed in a single piece preferably by casting, substantially X-shape in plan view and arranged on top of the central portion of this bolster is a center bearing 17. The arms of this bolster are preferably box-shape in cross section although they may be of any desired cross sectional shape, and the ends of said arms are provided on their undersides with convex bearings 18 which rest in the concave bearing seats 14.

Formed integral with the bearings 18 and projecting upwardly into the ends of the arms of the bolster are cylindrical housings 19 which receive the cylindrical lugs or bosses 15. The recesses in these housings 19 are slightly larger in diameter than the diameter of the lugs of bosses 15, and thus each cross bolster has slight lateral play with respect to the arms of the bolster which are supported by said cross bolsters. Thus, when the brakes of the truck are applied, the cross bolsters will move horizontally a slight degree under the forces set up by the application of said brakes, and the tubular lugs or bosses 15 bearing against the cylindrical housings 19 will act as stops and limit the movement of the cross bolsters with respect to the bolster.

The center bolster is locked to the cross bolsters by means of vertically disposed bolts 20 which pass through the tops of the housings 19 and through the tubular lugs or bosses 15, and located on the lower ends of these bolts within the ends of the arms of the bolster are nuts 21. There is sufficient space between these nuts and the top walls of the cross bolster to permit slight vertical play between the cross bolsters and the ends of the bolster arms, and which play occurs whenever any one of the forward wheels passes over a high joint or a sharp rise in one of the track rails.

The ends of side bearing arches 22 are positioned on the ends of the arms of the bolster 16 near the sides of the truck, and said arches may be cast integral with the center bolster or formed separate and attached thereto as shown in Fig. 2.

By yieldingly or flexibly connecting the center bolster to the cross bolsters the torsional strains transmitted to the bolster as a result of the truck wheels passing over sharp elevations in the track rails are reduced to a minimum and such construction also tends to more evenly distribute the weight of the load upon the cross bolsters and side frames of the truck, than where the center bolster and cross bolsters are formed integral or rigidly connected.

My improved construction provides substantially universal bearings between the arms of the bolster and the cross bolsters, and thus one cross bolster can rock or yield slightly independent of the other.

A truck of my improved construction is simple, comparatively light in weight, and at the same time has the requisite strength to meet all ordinary service conditions. By flexibly mounting the center bolster upon the cross bolsters all tendency of strains and forces to distort said bolsters is overcome.

It will be readily understood that minor changes in the size, form and construction of the various parts of my improved six wheel car truck may be made and substituted for those herein shown and described, without departing from the spirit of my invention, the scope of which is set forth in the appended claims.

I claim:

1. In a car truck, the combination with a pair of cross bolsters, of a center bolster having pairs of arms with one pair bearing on each cross bolster, and there being a universal joint between each arm and bolster.

2. In a car truck, the combination with a truck frame, of a pair of cross bolsters, yieldingly mounted in said frame, and a substantially X-shaped center bolster supported by said cross bolsters and connected thereto by universal joints.

3. In a car truck, the combination with cross bolsters, of a center bolster yieldingly connected to said cross bolsters, and side bearings supported on said center bolster.

4. In a car truck, the combination with a pair of yieldingly mounted cross bolsters, of a center bolster flexibly connected to and supported by said cross bolster, and side bearing supports on said center bolster.

5. In a car truck, a pair of cross bolsters, and a center bolster having a pair of universal joint connections with each cross bolster.

6. In a car truck, a pair of cross bolsters, a center bolster having a pair of universal joint connections with each of said cross bolsters, and side bearing supports on said center bolster.

7. In a car truck, a pair of cross bolsters provided with bearing seats, and a substantially X-shaped center bolster, the ends of the arms of which center bolster are mounted for universal movement in the seats on the cross bolsters.

8. In a car truck, a pair of cross bolsters provided with bearing seats, a substantially X-shaped center bolster, the ends of the arms of which center bolster are mounted for universal movement in the seats on the cross bolsters, and side bearing arches on said center bolster.

9. In a car truck, a pair of cross bolsters, and a center bolster flexibly connected at separate points to each cross bolster.

10. In a car truck, a pair of cross bolsters, and a center bolster yieldingly connected at two separated points to each cross bolster.

11. In a car truck, a pair of cross bolsters, and a center bolster having pairs of arms which are supported by and yieldingly connected to said cross bolsters.

In testimony whereof I hereunto affix my signature in the presence of two witnesses, this 29th day of August, 1913.

HARRY M. PFLAGER.

Witnesses:
FRED H. BLANKENHORN,
HAL C. BELLVILLE.